July 9, 1935.  H. M. KILPATRICK  2,007,201
LAMP TESTING MACHINE
Filed June 28, 1926  3 Sheets-Sheet 1
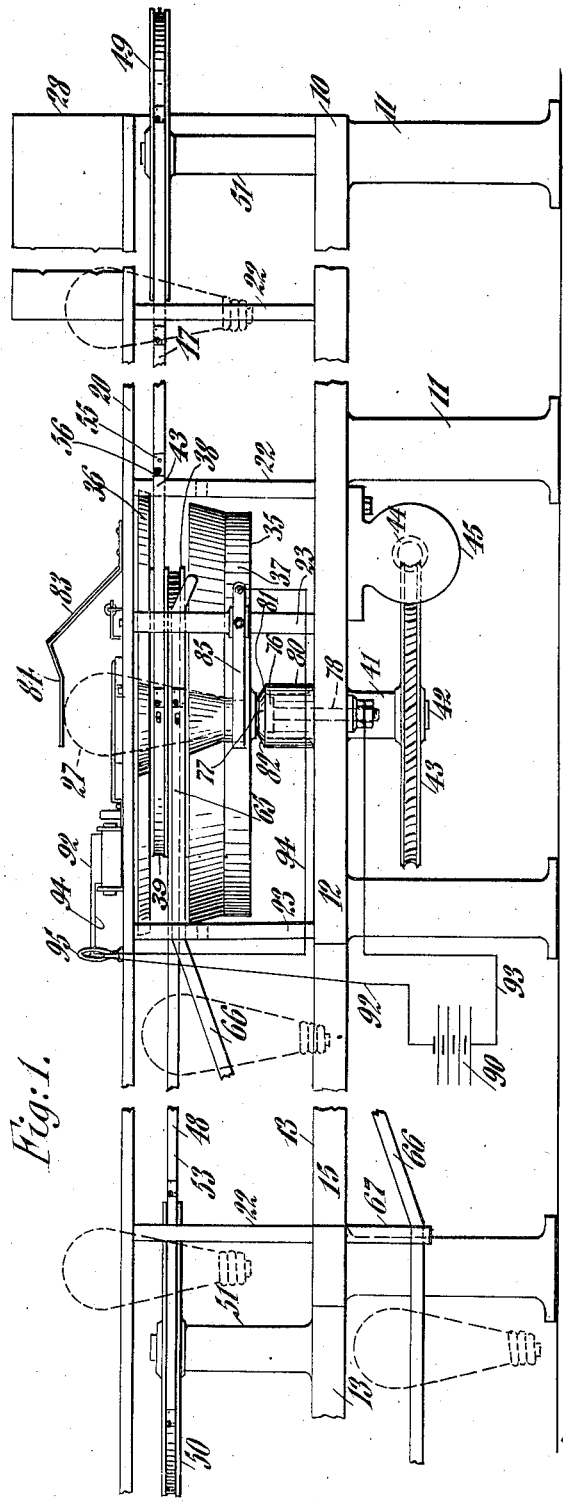
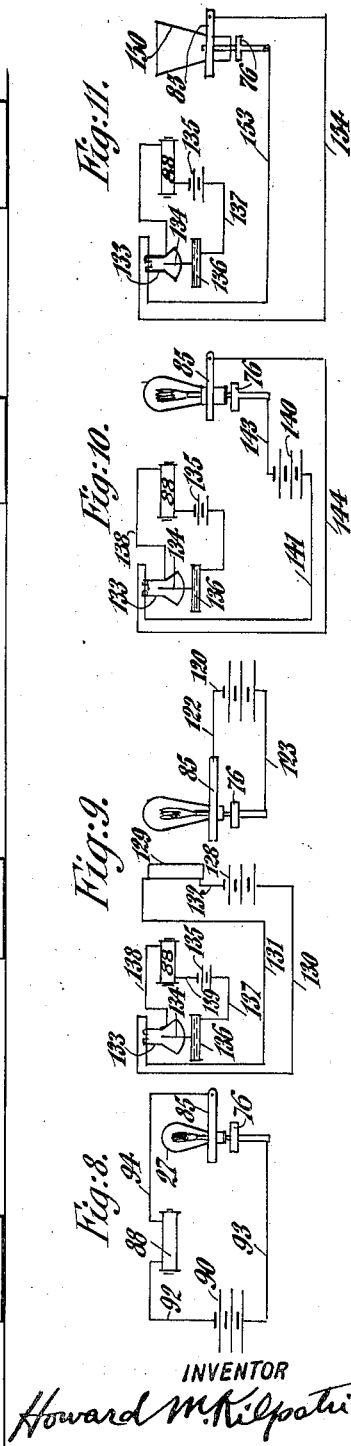
INVENTOR
Howard M. Kilpatrick July 9, 1935.   H. M. KILPATRICK   2,007,201
LAMP TESTING MACHINE
Filed June 28, 1926   3 Sheets-Sheet 2
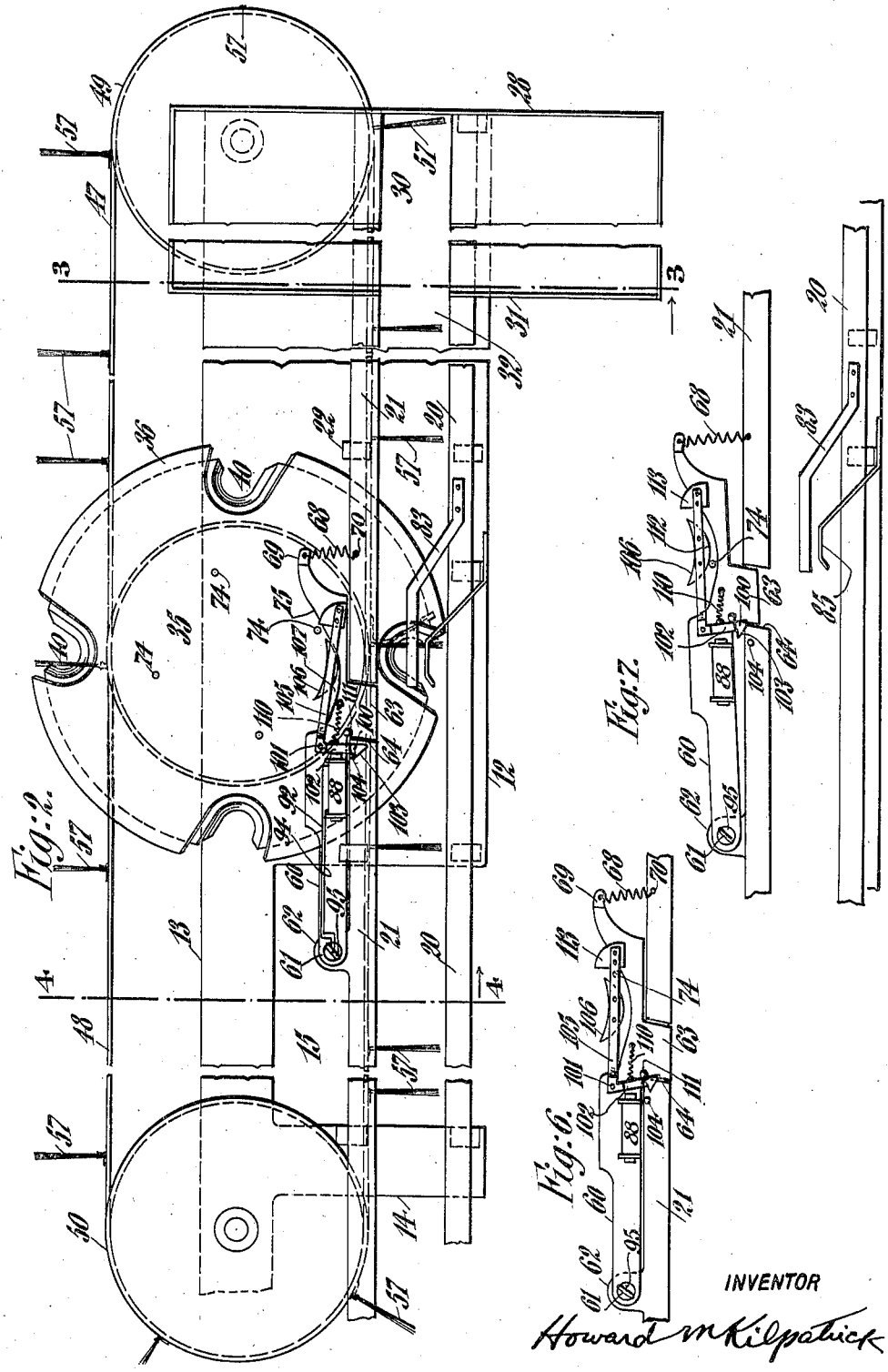
INVENTOR
Howard M Kilpatrick

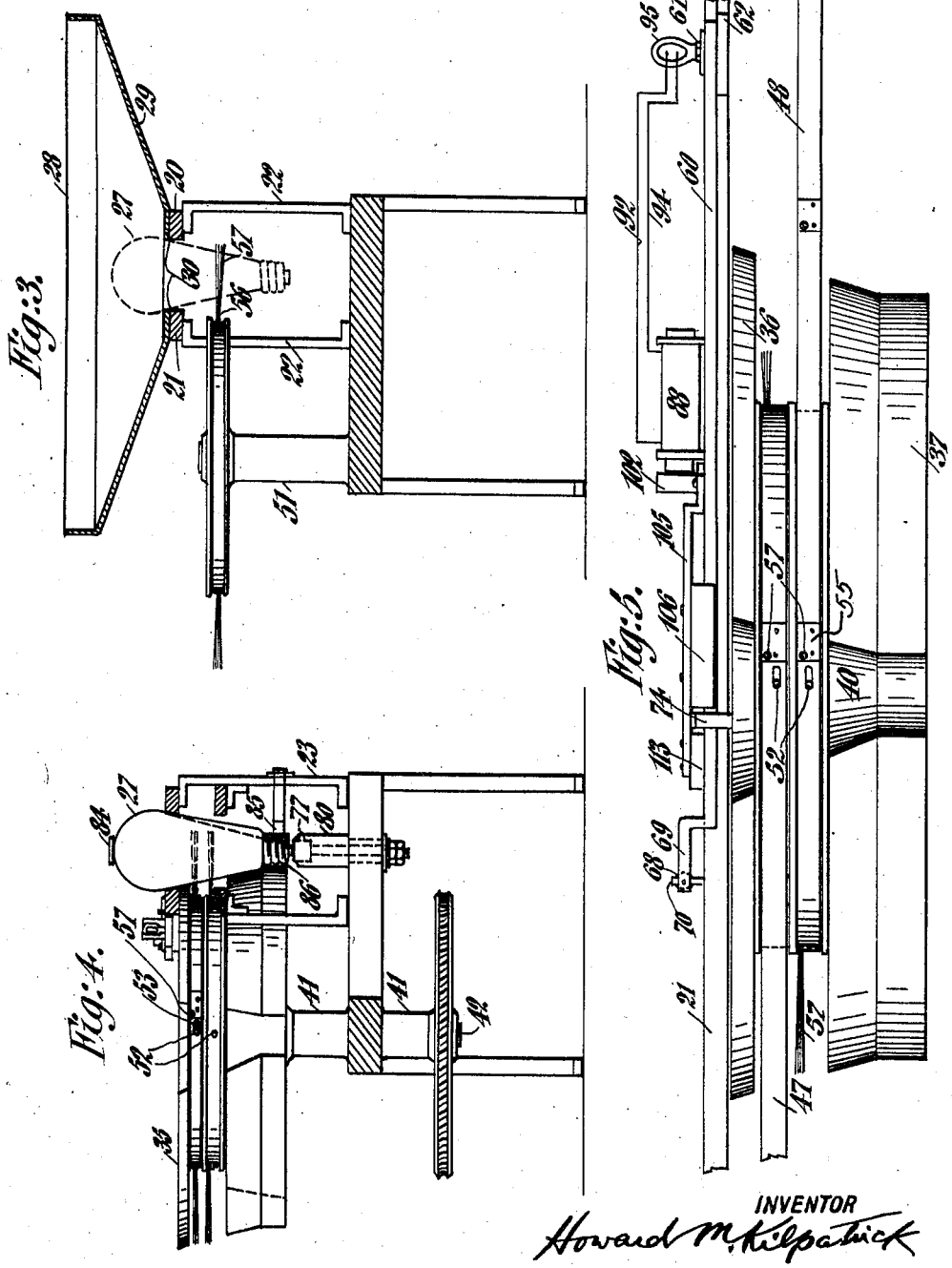

Patented July 9, 1935

2,007,201

UNITED STATES PATENT OFFICE 2,007,201

LAMP TESTING MACHINE

Howard M. Kilpatrick, New York, N. Y.

Application June 28, 1926, Serial No. 119,076

19 Claims. (Cl. 209—81)

This invention relates to machines or apparatus for testing the conductivity of electric devices and more particularly to means for testing electric lamps as to the condition or continuity of the filament, though it is noted that the invention is not limited to lamps nor in some respects even to electrical devices.

One object of the invention is to provide an automatic apparatus of this kind which will successively test lamps or other articles submitted thereto and segregate different grades of the articles in accordance with the test.

Another object of the invention is to provide an improved feeding means suitable for apparatus or devices of this kind.

Another object of the invention is to provide an apparatus or device of this kind adapted to receive large numbers of lamps or other articles in bulk, feed them one at a time to testing means and to segregate the abnormally operating lamps or articles from those of normal operation.

Other objects of the invention are to improve generally the simplicity and efficiency of testing and feeding devices and to provide a device or apparatus of this kind which is durable, reliable and very economical in operation, and which is economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved lamp testing machine which, briefly stated, includes guide rails for guiding lamps from a hopper along a normal path past testing means, discard rails adapted to receive defective lamps dropped from said guide rails through the operation of the testing means. The lamps are fed along the guide rails until the lamp terminals engage a pair of contacts connected in series with an electromagnet and a source of current. Means controlled by said magnet when energized holds closed a gate segment in one of the guide rails while a lamp of unbroken filament, which engaged the contacts to complete the circuit, passes, or opens said gate when the magnet is de-energized by the interposition of a lamp of broken filament between the contacts, and drops the defective lamp to the discard rails for segregation from the other lamps.

In the accompanying drawings, showing by way of example, several of many possible embodiments of the invention, Fig. 1 is a fragmental side elevation showing the assembled machine;

Fig. 2 is a fragmental plan of the machine;

Fig. 3 is a transverse vertical sectional view, partly in elevation, showing the turret and associated parts, said section being taken on the line 3—3 of Fig. 2, looking in the direction of the arrow of said line;

Fig. 4 is a transverse vertical sectional view, partly in elevation, showing the hopper and parts of the feeding means, said section being taken on the line 4—4 of Fig. 2, looking in the direction of the arrow of said line;

Fig. 5 is a fragmental side elevation, on a larger scale, showing the gate operating means;

Figs. 6 and 7 are fragmental plans showing the different positions of the gate operating means;

Fig. 8 is a fragmental diagrammatic view showing the electrical connections of Fig. 1; and Figs. 9 to 11 are fragmental diagrams showing electrical connections for modified forms of the invention.

The various parts of the apparatus are carried on a base 10 having supporting legs 11 and comprising a main portion 12 (Fig. 2) having a longitudinal extension 13 and a lateral extension 14 defining an open space 15.

Outer and inner parallel upper track rails 20, 21 supported on brackets 22, 23 (Fig. 1) a distance above the front part of said main portion, open space and lateral extension are disposed a distance apart slightly less than the greatest transverse diameter of the bulb of an electric lamp 27 to be tested, whereby the lamp may be supported thereby as shown. A trough shaped hopper 28 longitudinally mounted on the receiving end of said rails has its bottom inclined as at 29 (Fig. 3) to direct the lamps to a bottom opening 30 to permit the heavier small end of the lamp to fall between the rails, the advance wall 31 being open as at 32 for the passage of the lamps.

A downwardly pointed truncated cone-shaped turret 35 (Fig. 2) rotatably mounted on said base near said open space 15 just under said rails with its upper front edge about tangential to the outer rail 20 comprises an upper disk 36, a lower drum 37 and superposed flanged feed and discharge drive pulleys 38 and 39 of less diameter than the drum and disk and interposed therebetween.

The periphery of said turret is provided with a plurality of downwardly pointed approximately semi-conical seats or recesses 40 adapted conformably to receive approximately half of each lamp pushed along the rails thereto as the turret is rotated, as will be explained.

A vertical main shaft bearing 41 (Figs. 1 and 4) on said base carries a vertical main shaft 42 receiving the turret fast thereon, and projecting beneath the base, where it carries a worm wheel 43 fast on the lower end of the shaft and engaged by a worm 44 on the shaft of a motor 45 mounted on the lower face of the base, whereby the turret is slowly rotated.

Horizontal feed and discharge belts 47 and 48 received on said pulleys respectively are carried around idler pulleys 49 and 50 rotatably mounted on pedestals 51 at the receiving end of said base and on said longitudinal extension 13 respectively for holding the frontward portion of said belts under said inner rail 21. Pins 52 (Fig. 4) carried by the active face of said drive pulleys and engageable in elongated sprocket holes 53 provided at regular intervals along the belts constrain the belts to move with the drive pulleys.

Conveyor brackets 55 secured on said belts comprise plates each provided at the forward upper corner with a projecting tube 56 carrying bristles 57 (Fig. 3) projecting nearly to the outer rail and adapted to engage the lamps 27 to yieldably convey them along between the rails. Said brackets are so positioned on the belts as to engage and move a lamp into a recess 40 as the recess moves between the rails.

A bar 60 (Fig. 2) pivoted on a pivot bolt 61 on a lug 62 mounted on the rear side of the inner rail toward the discharge end thereof is provided with a gate 63 adapted to fill an elongated gap 64 provided in the top face and inner edge of said inner rail 21 at the discharge side of the turret, said gate being continuous with the inner edge of the inner rail when in closed position, and being adapted to increase the distance between the rails when in open position as in Fig. 7, thereby to let a passing lamp fall through to a pair of discard rails 65 just beneath the delivery rails 20, 21 at said gap, said discard rails 65 being continued downward as at 66 through said open space 15 and under said lateral extension 14, being there carried by brackets 67, whereby the lamps thereon are carried beneath the path of the lamps on the delivery rails 20, 21. A spring 68 tensioned between the free end 69 of the bar and a pin 70 on the rail 21 yieldably holds the gate closed.

A plurality of pins 74 one for each recess projecting from the top of said turret are engageable one at a time with a cam edge 75 provided at the free end of said bar 60 as the lamp reaches a position a little short of said gate 63, thereby to positively close the gate should the spring 68 fail. A lower electric contact 76 is adapted to engage the tip terminal of a lamp seated in a seat 40 disposed on a radius of the turret perpendicular to the tracks.

Said contact 76 comprises a horizontal longitudinally elongated member 77 providing a top face, and a vertical insulated stem 78 passing through the base. An insulating shield 80 surrounds the contact flush with said top face to prevent contact of the lamp thimble with the said contact. Said shield is formed with forward and rear beveled faces 81 and 82 inclined away from said top face to permit the lamp tip to ride easily to and from the contact. A top spring 83 mounted on the outer rail 20 and provided with a downwardly curved face 84 is adapted to engage the top of the lamp to press the lamp upon the contact 77 as the lamp passes contact position.

A side contact 85 consisting of a spring having a wiping portion adapted to engage the lamp thimble 86 as the lamp passes said position is mounted on one of the brackets 23 and insulated therefrom.

An electromagnet 88 (Fig. 2) disposed longitudinally on the bar 60 and a source of current 90 are connected by conductors 92, 93 and 94 in series with said contacts, whereby the magnet is energized when a perfect lamp is held against said contacts and is not energized when a lamp with discontinuous filament is in said position. The conductors 92 and 94 are passed through a ring 95 on the pivot pin of the bar 60.

A latch 100 pivoted as at 101 on said bar 60 near the outer edge thereof carries an armature 102 drawn by said magnet and has a hooked end 103 adapted to catch on a pin 104 when the armature is thus drawn by the magnet, when a perfect lamp is between the contacts 76 and 85, thereby to lock said gate closed. An arm 105 fast on said latch at the pivot end thereof and extending toward the free end 69 of the bar slightly above the bar carries a cam block 106 fast under the arm and adapted to seat in a recess 107 adjacent to said cam edge 75 to form a continuation of said cam edge, when the magnet is energized, whereby said block is engaged by said pin as the pin continues to revolve to hold the gate closed as the perfect lamp passes the gate 63.

A spring 110 retracts said latch 100 into contact with a stop 111, when the magnet is de-energized, as when a defective lamp is between the contacts 76 and 85 thus unlatching the latch for permitting the moving of the gate 63 out of the gap 64, as will be explained. Said block 106 is provided with a convexed rear cam face 112 adapted to move into the path of the pin 74 as in Fig. 6, when the magnet is de-energized, and said latch 100 is released and the arm 105 swung out to its limit of movement by said spring, whereby the pin 74 engages said convexed face 112 and draws the bar 60 away from the rail and the gate 63 somewhat out of the gap to let the defective lamp drop to the lower rails 65. The next pin 74 then engages the cam edge 75, closing the gate, and then meets a restoring cam block 113 secured fast to the lower face of the free end of the arm 105 and lying on top of the bar in the path of the pin when the latch is released. This block is engaged by said next pin 74 as the lamp of the associated seat 40 moves to the contacts 76, 85, thereby to move the armature 102 to the magnet to be held thereby if a conductive lamp is presented to the contacts. If the magnet when energized is strong enough to draw the armature, the block 113 is then provided merely as an extra precaution.

Fig. 8 is a diagram of the connections of Fig. 1, showing the source of current 90 having its terminals respectively connected by means of conductors 92, 93 and 94 with the pair of contacts 76 and 85 adapted to engage the terminals of the lamp 27 whereby said lamp source and magnet 88 are connected in a series circuit and the lamp fed thereto is lighted if the filament is continuous, whereby said magnet is energized and the lamps guided along the upper rails 20, 21.

The operation of the machine is very simple. The lamps are placed in the hopper by hand, as many at a time as is convenient, and the smaller ends of several of them fall through the bottom opening 30, from which they are carried forward by the bristles 57 into the recesses 40, which are timed to meet the on-coming lamp. Instead of presenting the lamps to the hopper by hand, they may be presented thereto direct as they may be discharged from a machine of some previous operation on the lamps.

The recess 40 carries the lamp under the curved face 84 of the top spring 83, which forces the tip terminal of the lamp into good contact with the contact 76 at the same time as the side contact 85 engages the thimble terminal, thus completing the circuit through the magnet 88, if the filament is continuous.

When the filament is thus continuous, the magnet 88 is energized, thus holding the armature 102 drawn to the magnet and the hooked end 103 engaged over the pin 104, thereby to lock the gate closed and to hold the block 106 in the recess 107 to permit the on-coming pin 74 to pass along the outer edge of the block to hold the hooked end 103 latched and the gate closed until the lamp has passed the gate, whereupon the bristles of the discharge belt 48 carry the lamp along to the discharge end of the rails 20 and 21, to be removed by hand or to be passed on to some machine for subsequent operation.

If the lamp presented to the recess 40 and contacts 76 and 85 is broken, no current will pass, the magnet 88 will not be energized and the spring 110 will retract the latch 100 into contact with the stop 111, thus unlatching the hooked end from the pin 104, at the same time moving the block 106 out of the recess 107 to permit the on-coming pin 74 to engage the rear cam face 112 of the block, thereby to draw the bar 60 away from the rail and to draw the gate 63 out of the gap to permit the lamp, as it is passed on by the recess 40, to fall through to the lower discard rails 65 and be carried by the bristles on to the incline 66 to slide out of the path of the perfect lamps passing along the rails 20, 21.

After the dropping down of the imperfect lamp the gate is closed by the spring 68, but should the spring fail fully to close it, the next pin 74 engaging the cam edge 75 positively closes the gate, while the same pin 74 engaging the restoring block 113 moves the arm 105 toward the rail and moves the armature to the magnet, thus preparing the machine to test the next lamp presented to the contacts.

The diagrams of Figs. 9 to 11 show how the machine may be adapted to uses other than that just described.

In Fig. 9 the main source of current 120 has its terminals respectively connected by means of conductors 122 and 123 with the pair of contacts 85 and 76 adapted to engage the terminals of the lamp 27 whereby said lamp and source are connected in a series circuit and the lamp fed thereto is lighted if the filament is continuous. A secondary source of current 128 and a selenium cell 129 are connected by means of conductors 130, 131, 132 in a series circuit with a current meter 133 having a needle 134 downwardly pointing at normal load, whereby normal light from a normal lamp shines upon the selenium cell and permits normal current to pass the meter, thus causing said needle to point downwardly.

A local current source 135 and a mercury bath 136 in which said needle 134 dips at normal load, are connected in series with the electromagnet 88 by conductors 137, 138, 139 whereby said magnet is energized at normal load and the lamps guided along the upper rails 20, 21. Should the lighting be above or below standard, the needle 134 will not touch the mercury bath, the magnet will not be energized, and the lamp will be dropped to the discard rails.

Obviously light transmitting means or lights other than electric may be thus tested by the aid of the selenium cell.

In Fig. 10, the main source of current has its terminals respectively connected by means of conductors 141, 143 and 144 in series with the current meter 133 and the contacts 85 and 76 adapted to engage the terminals of the lamp 27 whereby said lamp and source are connected in a series circuit with the meter and the lamp is lighted if the filament is continuous. The needle 134 of the meter points downwardly at normal load, whereby normal current from a normal lamp permits normal current to pass the meter and said needle to point downwardly, whereupon the magnet 88 is energized as in Fig. 9, and the lamps guided along the upper rails 20, 21, or if the current is above or below normal, dropped to the discard rails. By this arrangement, lamps of a certain resistance may be accurately selected, and lamps with crossed as well as broken filaments picked out.

In Fig. 11, the circuit is arranged for testing dry cells having a shape somewhat as shown and adapted to be fed along the rails in the same manner as the lamps.

In Fig. 11 the source of current is the dry cell itself. Its terminals engage with the pair of contacts 75 and 86 whereby said cell is connected by means of conductors 130, 131, 132 in a series circuit with the current meter 133, whereby normal voltage and therefore normal current from the cell permits normal current to pass the meter and said needle 134 to point downwardly, whereby said magnet 88 is energized at normal load, as in Fig. 10, and the cell is guided along the upper rails 20, 21. If the voltage of the cell is above or below normal, the needle will not dip in the mercury bath and the cell will be dropped to the discard rails.

I claim as my invention:

1. In combination, a pair of guide rails for guiding lamps along a normal path, one of said rails having a gate segment; a pair of discard rails adapted to receive lamps dropped from said guide rails; a pair of contacts; a turret having peripheral recesses in which the lamps fit; feed means for feeding the lamps along the guide rails into the recesses; means for rotating the turret until the respective lamp terminals engage said contacts; an electromagnet; a source of current; conductors whereby said source, magnet and contacts are connected in series; and retarded means controlled by said magnet when energized to hold the gate segment closed while a lamp of unbroken filament, which engaged the contacts to complete the circuit, passes, and to open said gate after the magnet is de-energized, while a lamp is presented to the terminals, to drop said lamp to the discard rails after it leaves the terminals.

2. In combination, a pair of guide rails for guiding lamps along a path; means for moving the lamps along the rails; and a trough-shaped hopper longitudinally mounted on the receiving end of said rails and having its bottom and the wall at its discharge end open for the passage of parts of the lamps.

3. In combination, a pair of guide rails for guiding lamps along a path; yieldable means for moving the lamps along the rails; lamp testing means associated with the rails; and a trough-shaped hopper longitudinally mounted on the receiving end of said rails and having its bottom and the wall at its discharge end open for the passage of parts of the lamps.

4. In combination, means for guiding electric bulbs to be tested; and means for passing electric current through the filaments of said bulbs, to cause the filaments to light up; and means controlled by said current for affecting the movement of the bulbs.

5. In combination, electric filament lamp feeding means; electric means for conducting an electric current through the lamps presented thereto by the feeding means for providing a visual indication that the current is passing; and means controlled by said current for affecting the movement of the lamps.

6. In combination, a lamp feeding means; electric means tending to cause an electric current to pass through lamps presented thereto by the feeding means to cause the lamp to give off light; and means controlled by said light for affecting the direction of the path of the articles after the presentation.

7. In a lamp testing device, a source of current; a pair of contacts adapted to engage the terminals of a lamp; an electro-magnet; conductors connecting said source, magnets and contacts in series, whereby the lamp is lighted to give a visual indication that the device is operating correctly, and whereby the magnet is energized when the filament is complete; and guide means for the lamps controlled by said magnet.

8. A method comprising submitting the terminals of an electric filament lamp to a difference of potential to cause the lamp to light; subjecting the lamp to one condition if no current passes the filament; and employing the current to subject the lamp to second condition if the current does pass the filament.

9. In combination, a main source of current; a pair of contacts adapted to engage the terminals of a lamp presented thereto; conductors connecting the terminals of said source with said contacts, whereby said lamp and source are connected in a series circuit and the lamp lighted if the filament is complete; a secondary source of current; a selenium cell; a current meter having a needle downwardly pointing at normal load; conductors connecting said secondary source, meter and cell in series circuit, whereby normal light free from lamp causes normal current to pass the meter; a local current source; a mercury bath in which said needle dips at normal load; an electromagnet connected in a local series circuit with said needle and bath; and guide means controlled by said magnet.

10. In combination, a pair of guide rails for guiding lamps along a normal path, one of said rails having a gate segment; a pair of discard rails adapted to receive lamps dropped from said guide rails; a pair of contacts; feed means for feeding the lamps along the guide rails until the lamp terminals engage said contacts respectively; an electro-magnet; a source of current; conductors whereby said source, magnet and contacts are connected in series; and means controlled by said magnet when energized to hold the gate segment closed while a lamp of unbroken filament, which engages the contacts to complete the circuit, passes, and to open said gate when the magnet is de-energized to drop the lamp to the discard rails.

11. In combination, a pair of guide rails for guiding, downwardly pointed cone-shaped articles having terminals at the smaller end, along a normal path, one of said rails having a gate segment; a pair of discard rails adapted to receive the articles when dropped from said guide rails; a pair of contacts; a turret having downwardly pointed peripheral recesses in which the articles fit; feed means for feeding the articles along the guide rails into the recesses; means for rotating the turret until the respective article terminals engage said contacts; an electro-magnet; means whereby said magnet is controlled by current passing through said article and contacts; and retarded means controlled by said magnet when energized to hold the gate segment closed while an article which engaged the contacts to connect them passes, and to open said gate after the magnet is deenergized while an article is presented to the terminals, to drop said article to the discard rails after it leaves the terminals.

12. In a testing machine for electric lamps the combination with a carrier to convey electric lamps while being tested, of means for forming electric connections from a source of electric current to the traveling lamp and from the lamp back to the source of current so that the electric system of the traveling lamp itself will complete the connections and become illuminated to give a visual indication if the lamp is good, means for receiving the lamps from the carrier and means coacting with the receiving means and controlled by the passage of current through the tested moving lamps to separate the good lamps from those through which current would not pass.

13. A method comprising submitting the terminals of electric filament lamps while exposed to view to a difference of potential; passing the lamps through one path if no current passes through the filament; and employing the current, if it does pass through the filament, to serve the double function of causing the lamp to pass through a second path and causing the filament to give a visual indication that the lamp is good.

14. A machine for testing electric lamps, comprising a carrier to convey electric lamps along a path while being tested; electric means engageable with each lamp while the lamp is being moved at a testing point in the path of the lamp for conducting current through the filament of the moving lamp, if good; a means to receive the lamps after they have been thus engaged by the electric means; diverting means at a later point in said path adapted to move to separate, from the good lamps, those lamps through which no current would pass; and settable means settable by and during the passage of current through the lamp being tested, and adapted to initiate the diverting movement by said diverting means after the lamps have left testing point.

15. A machine for testing electric bulbs and the like comprising a rotary carrier having sockets therein; a conveyor having movable parts for horizontally moving the bulbs to the carrier and cooperating with the carrier to move the electric contact portions of the bulbs into the sockets; circuit contacts adapted to be engaged by said electric contacts; and non-traveling means pressing on the end of the bulbs for pressing the electric contacts against the circuit contacts.

16. A machine for testing lamps or the like, comprising a rotary carrier having sockets; a movable conveyor moving in part in a path tangential to an arc of the axis of the carrier, for conveying lamps to the sockets, and cooperating with the carrier to cause the base portions of the lamps to move into the sockets.

17. A machine for testing electric bulbs and the like, comprising a carrier having supporting means adapted to receive and support the bulbs; contacts near said carrier; means for disposing said bulbs in the supporting means, and additional means for automatically engaging the bulb to cause the contact elements of the bulbs to engage with said contacts while the carrier is moving.

18. A machine for testing electric bulbs and the like, comprising a rotary carrier having sockets therein; a conveyor having parts movable to approach the axis of said carrier, for horizontally moving the bulbs to the carrier and cooperating with the carrier to move the electric contact portions of the bulbs into the sockets; circuit contacts adapted to be engaged by said electric contacts; and non-traveling means pressing on the ends of the bulbs for pressing the electric contacts against the circuit contacts.

19. A machine for testing electric bulbs and the like comprising a rotary carrier having sockets therein; a conveyor having parts movable to approach the axis of said carrier for moving the bulbs to the carrier and cooperating with the carrier to move the electric contact portions of the bulbs into the sockets; circuit contacts adapted to be engaged by said electric contacts; and means pressing on the ends of the bulbs for pressing the electric contacts against the circuit contacts.

HOWARD M. KILPATRICK.